Figure 1:
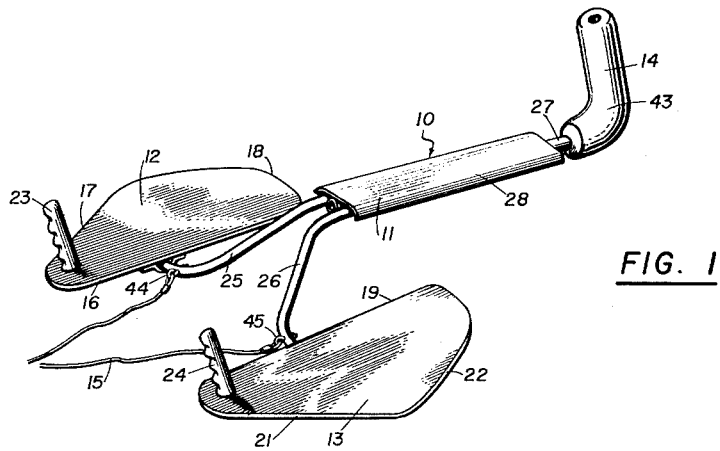

June 30, 1964  R. M. NUTTING  3,139,055
WATER VEHICLE

Filed Nov. 16, 1962  2 Sheets-Sheet 1

ROBERT M. NUTTING
INVENTOR.

BY
Aaron S. Blodgett

June 30, 1964  R. M. NUTTING  3,139,055
WATER VEHICLE

Filed Nov. 16, 1962  2 Sheets-Sheet 2

ROBERT M. NUTTING
INVENTOR.

BY Howard J. Blodgett

United States Patent Office 3,139,055
Patented June 30, 1964

3,139,055
WATER VEHICLE
Robert M. Nutting, 91 Dillon St., Leominster, Mass.
Filed Nov. 16, 1962, Ser. No. 238,104
5 Claims. (Cl. 114—16)

This invention relates to a water vehicle and, more particularly, to apparatus arranged to be towed behind a motor boat while permitting controlled motion on the top of the water and under the water.

In the past, it has been suggested that a vehicle be provided on which an operator may rest to be towed behind a motor boat. It has also been suggested that such a vehicle be provided with planes so that the operator can control the motion of the vehicle through the water. Certain difficulties have been experienced, however, in that, if the vehicle is made of a practical simplicity, the means of attaching the vehicle to the underwater swimmer inhibits his ability to control the planes and to rest comfortably while searching, while performing underwater acrobatics or like activity. For instance, some of these previously-known devices engage the operator under the arms, so that his arms are not completely free to control the planes; furthermore, they produce a force on the body of the operator that tends to tire him. These and other difficulties experienced with the prior art devices have been obviated in a novel manner by the present invention.

It is, therefore, an outstanding object of the invention to provide a water vehicle consisting of a light-weight, portable, towed diving plane capable of rapid assembly and disassembly.

Another object of this invention is the provision of a water vehicle designed for maximum compatibility with the operator, allowing freedom of natural and untiring arm movements for control purposes with the forward thrust transferred to the operator by a cushioned saddle contoured to his body.

A further object of the present invention is the provision of a water vehicle consisting of a diving plane offering maximum unobstructed visibility for use in underwater search.

It is another object of the instant invention to provide a submergible water vehicle capable of high-riding, splash-free characteristics when operating on the surface of the water.

It is a further object of the invention to provide a diving plane capable of stable operation on or below the surface with complete freedom of both hands on the surface and temporary one-hand operation while submerged.

A still further object of this invention is the provision of a diving plane that is self-floating with a relatively high buoyancy factor for ease of mounting, towing, or abandonment.

It is a still further object of the present invention to provide a diving vehicle that is clean in appearance and that is free of struts, braces, and other operator encumbrances.

Another object of the invention is the provision of a water vehicle that offers body-hugging characteristics necessary for full rolls, rapid ascent and descent, upside down operation, and other possible sport uses where stunt maneuvers are required for competitive or non-competitive sport.

Another object of the invention is the provision of a water vehicle which has an aesthetic, colorful, and inexpensive design with a maximum of simplicity of operation.

Another object of the invention is the provision of an underwater diving vehicle capable of being towed by almost all types of outboard motor-powered and inboard motor-powered boats and capable of being towed by motor boats of small horsepower.

With these and other objects in view, as will be apparent to those skilled in the art, the invention resides in the combination of parts set forth in the specification and covered by the claims appended hereto.

Figure 2:
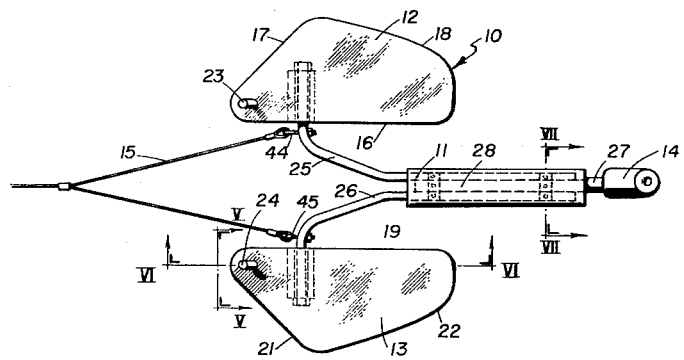
Figure 3:
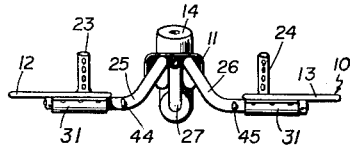
Figure 4:
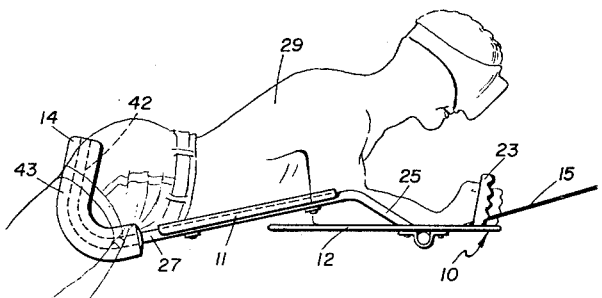
Figure 5:
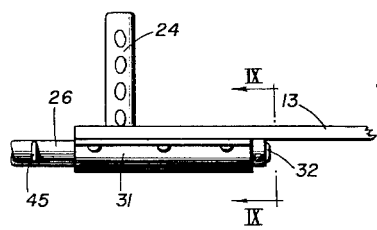
Figure 6:
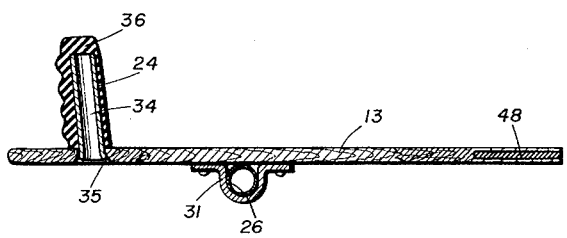
Figure 7:
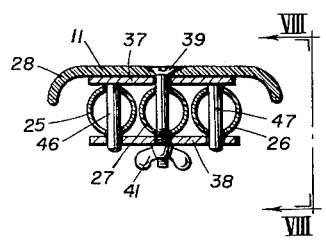
Figure 8:
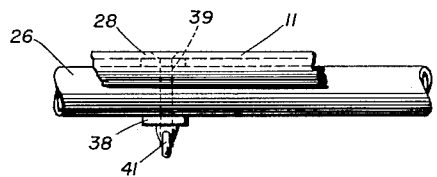
Figure 9:
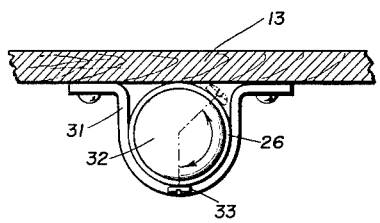

The character of the invention, however, may be best understood by reference to one of its structural forms as illustrated by the accompanying drawings in which:

FIG. 1 is a perspective view of a water vehicle embodying the principles of the present invention, FIG. 2 is a plan view of the vehicle, FIG. 3 is a front end view of the vehicle, FIG. 4 is a side view of the vehicle showing the operator in position, FIG. 5 is a view of a portion of the vehicle taken on the line V—V of FIG. 2, FIG. 6 is a sectional view of a portion of the vehicle taken on the line VI—VI of FIG. 2, FIG. 7 is a sectional view of the vehicle taken on the line VII—VII of FIG. 2, FIG. 8 is a side view of a portion of the vehicle taken on the line VIII—VIII of FIG. 7, and FIG. 9 is an enlarged view of a portion of the vehicle taken on the line IX—IX of FIG. 5.

Referring first to FIG. 1, wherein are best shown the general features of the invention, the water vehicle, indicated generally by the reference numeral 10, is shown as consisting of a main body 11 carrying at its forward end a right-hand plane 12 and a left-hand plane 13. At the rear end, it carries a saddle 14. To the front of the main body is attached a towline 15 which is adapted to be attached to the rear of a rotor boat (not shown). The right-hand plane 12 is provided with a straight inner edge 16 which extends in the direction of movement of the vehicle and in the direction of the length of the main body 11. The plane has a rearwardly and outwardly inclined forward edge 17 and an inwardly curved rear edge 18, the rear edge 18 inclining inwardly and rearwardly for a portion of its length and then curving directly transversely of the main body in to meet the inner edge 16. Similarly, the plane 13 is provided with an inner edge 19, a forward edge 21, and a rearward edge 22. The plane 12 is provided with a generally vertical handle 23 which extends upwardly from its upper surface adjacent the intersection of the inner edge 16 and the forward edge 17; in a similar way, the plane 13 is provided with a handle 24 which extends upwardly from its upper surface adjacent the intersection of the inner edge 19 and the forward edge 21. A lead weight 48 is inserted in the body of each plane adjacent the rear edge for balancing of buoyancy forces.

The main body 11 is provided with a forwardly-directed right-hand frame tube 25, a forwardly-directed left-hand frame tube 26, and a rearwardly-directed frame tube 27. These three frame tubes are co-extensive in the central portion and in that common portion they are covered by a platform 28. As is evident in the drawings, the frame tubes 25 and 26 each have a straight portion at one end which enderlies the platform 28, an inclined intermediate portion which extends outwardly and downwardly from the straight portion, and a terminal portion which extends exactly transversely and horizontally from the inclined portion; this latter portion carrying the respective plane. The outward inclination of the inclined portion is best shown in FIG. 2, while the downward inclination of that portion is best shown in FIG. 4, this last figure of the drawings also showing an operator 29 in place on the vehicle. The tube 25 is provided adjacent the intersection of its inclined portion with its transverse portion with an eye bolt 44 to which the towline is attached, and the frame tube 26 is also provided with an eye bolt 45 similarly located, these eye bolts being located inwardly of the inner edges 16 and 19 of the planes 12 and 13, respectively, to avoid interference with the pivotal movement of the planes.

In FIG. 3 it can be seen that the underside of the plane 13 is provided with a bearing bracket 31 which is formed of plastic to provide a convenient and readily-operated transverse bearing in which the outer transverse end portion of the frame tube 26 is pivoted. As is best evident in FIG. 9, the outer end of the tube 26 is provided with a metal plug 32 which is held in the end of the tube by means of a screw 33 whose head extends outwardly of the tube and engages the outer end edge of the bearing bracket 31 to prevent withdrawal of the plane from the tube except when the plane is rotated into an unusual position approximately 135° away from its normal position. In that position of the plane the screw head resides in an open space in the bracket and the plane may be removed from the frame tube. In FIG. 3 it can be also seen that the handle 24 is formed, first of all, by an aluminum tube 34 which is swaged into a counter-bored portion of an aperture 35 extending through the plane 13. On the tube is placed a grip sleeve 36 formed of rubber or other elastomer material formed to fit the operator's hand.

FIG. 7 shows the manner in which the elements of the main frame 11 are held together at one end of the platform 28. First of all, the straight portions of the three frame tubes 25, 26, and 27 lie side-by-side in a horizontal row with the rearwardly-directed frame tube 27 lying between the other two. A metal plate 37 overlies these members, while a metal plate 38 underlies them. Finally, the platform 28 extends over the top of the plate 37 and is provided with downwardly-curved edges, the platform being formed of a rigid plastic material. The elements are fastened together by a bolt 39 having a head which is countersunk in the platform 28 and extends through the plate 37, through the rearwardly-directed frame tube 27, through the plate 38, and is provided at its lower side with a wing nut 41. A locating pin 46 welded at one end to the plate 37 extends through the tube 25 and through the plate 38. Similarly, a locating pin 47 welded at one end to the plate 37 extends downwardly through the tube 26 and through the plate 38. A similar method of holding the elements together is provided at the other end of the platform 28. As shown in FIG. 8, the platform 28 is curved downwardly around the frame tubes and extends at least ⅓ of the distance below their uppermost point.

Referring particularly to FIG. 4, it can be seen that the rearward part of the frame tube 27 is bent to provide an upwardly- and forwardly-directed end portion 42. Formed around this end portion and part of the straight portion of the tube 27 is a tubular pad 43 which is formed of flexible cellular plastic or similar rather soft waterproof floatation material. The portion 42 and the pad 43 form the saddle 14, and the material of which the pad 43 is formed is contoured to fit the crotch of the operator 29 comfortably.

The operation of the apparatus will now be readily understood in view of the above description. The operator 29 lies on the device in the water with his abdomen resting on the top of the platform 28. Because the planes 12 and 13 would normally be made of wood, because the tubes 25, 26, and 27 will normally be lightweight aluminum tubing with the ends plugged, and the pad 43 made of light foam material, the entire water vehicle 10 will be capable of floating. This, combined with the normal buoyancy of the human body, will cause the combination of the operator 29 and the water vehicle 10 to float close to the surface of the water. The towline 15 is attached to a motor boat, which may be of one of very low horsepower, as contrasted with the large horsepower motors that are necessary in water skiing. The saddle 14 with the pad 43 extends upwardly between the legs of the operator and the forward movement of the water vehicle through the towline 15 will apply a resultant force to the crotch of the operator, pushing him along from that area of his body. This means that he will be free to rest the weight of his forearm on the planes 12 and 13 while grasping the handles 23 and 24. The planes 12 and 13 can be rotated about the transverse portions of the frame tubes 25 and 26 at will. As the motor boat moves slowly forwardly, so does the water vehicle carrying the operator 29. If it is desired to ride on the surface of the water, the operator will press the rearward edges 18 and 22 of the planes 12 and 13, respectively, downwardly, so that the planes present a positive angle of attack to the water. This causes the front of the water vehicle to rise and the operator will glide over the surface of the water. If he wishes to go below the surface of the water, he will presumably wear a face mask; a downward thrust of the handles 23 and 24 will cause the planes 12 and 13 to assume a negative angle of attack. In other words, the forward edges 17 and 21 will be below the horizontal, while the rearward edges 18 and 22 will be slightly above horizontal. This will cause the vehicle to move downwardly in the well-known manner and to continue downwardly until the operator chooses to level out the planes. Incidentally, it should be noted that the tension in the towline 15 will form almost a direct line (neglecting any catenary curve) from the water vehicle to the motor boat. It may be that the angles of attack which are of interest are not always relative to horizontal but possibly relative to the line of the towline 15. When the operator reaches the level at which he wishes to glide horizontally under water, it will be necessary that the operator maintain the planes at a negative angle of attack relative to the towline 15.

It is also possible with the present invention to perform acrobatic maneuvers under water; for instance, by causing the plane 12 to have a negative angle of attack and the plane 13 to have a positive angle of attack, a twisting motion will take place and the operator in the water vehicle will perform a roll under water. This roll can continue indefinitely, or may be stopped at any point in the roll by the operator straightening out the planes. The roll may take place clockwise or counter-clockwise, depending upon the angles of the planes.

It should be noted that the water vehicle of this invention has a number of interesting features. First of all, it is possible to remove the planes 12 and 13 from the main body 11 by rotating the planes into a normally useless position, about 135° away from the normal zero angle of attack position, as shown in FIG. 9, so that the head of the screw 33 resides in an area such that the plane and the bearing 31 may be removed from the frame tubes 25 and 26. Also, it is important for proper maneuvering by a particular individual operator to locate the handles 23 and 24 the exact proper distance from the saddle 14. It is possible to make such adjustment to the size of the operator by varying the co-extensive relationship of the frame tube 27 relative to the frame tubes 25 and 26. This is done by removing both wing nuts 41 and both plates 38 and then removing the platform 28 with plates 37 affixed from the tubes 25, 26, and 27. The tubes are provided with a series of holes drilled entirely through them, so that the adjustment may be made by repositioning the platform assembly, the whole assembly being held together in tight condition by the wing nut 41 and its corresponding cooperating elements.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A water vehicle, comprising:
   (a) a generally elongated main body adapted to carry an operator, (b) a plane located at each side of the main body adjacent one end, each plane being mounted for pivotal movement about a transverse axis and being provided with a handle located forwardly of the axis for bringing about the pivotal movement, and (c) a saddle consisting of a generally vertical horn provided with resilient padding mounted at the other end of the main body adapted to transmit a propellant force to the crotch of the operator when the vehicle is towed through the water.

2. A water vehicle, comprising:

(a) a generally elongated main body having a generally elongated rectangular platform adapted to receive the abdomen of an operator, two frame tubes, each extending longitudinally from one end of the platform, then extending downwardly and outwardly and terminating in a transverse portion, (b) a plane located at each side of the main body adjacent one end, each plane being mounted for pivotal movement on the transverse portion of a frame tube and being provided with a handle located forwardly of the transverse portion of the frame tube for bringing about the pivotal movement, and (c) a saddle mounted at the other end of the main body adapted to transmit a propellant force to the operator when the vehicle is towed through the water.

3. A water vehicle, comprising:

(a) a generally elongated main body adapted to carry an operator, (b) a plane formed of a rigid floatation material located at each side of the main body adjacent one end, each plane being mounted for pivotal movement about a transverse axis, a relatively small portion of the plane located forwardly of the axis being provided with a handle for bringing about the pivotal movement, a relatively large portion of the plane being located rearwardly of the axis and adapted to receive the forearm of the operator, and (c) a saddle mounted at the other end of the main body adapted to transmit a propellant force to the operator when the vehicle is towed through the water.

4. A water vehicle, comprising:

(a) a generally elongated main body adapted to carry an operator, the main body consisting of a platform, two forwardly-extending frame tubes, and one rearwardly-extending frame tube, the frame tubes being partially coextensive under the platform and having adjustable fastening means serving to hold the tubes in side-by-side relationship under the platform, (b) a plane located at each side of the main body adjacent one end, each plane being mounted for pivotal movement about a transverse axis and being provided with a handle located forwardly of the axis for bringing about the pivotal movement, and (c) a saddle mounted at the other end on a generally vertical extension of the rearwardly-directed frame tube of the main body adapted to transmit a propellant force to the operator when the vehicle is towed through the water.

5. A water vehicle, comprising:

(a) a generally elongated main body adapted to carry an operator, and having two forwardly-directed tubes and a rearwardly-directed tube, (b) a plane located at each side of the main body adjacent one end, each plane being mounted on an extremity of a forwardly-directed frame tube for pivotal movement about a transverse axis and being provided with a handle located forwardly of the axis for bringing about the pivotal movement, and (c) a saddle mounted on the rearwardly-directed frame tube at the other end of the main body adapted to transmit a propellant force to the operator when the vehicle is towed through the water.

References Cited in the file of this patent

UNITED STATES PATENTS

| | | |
|---|---|---|
| 1,664,799 | Van Alphen | Apr. 3, 1928 |
| 1,712,620 | Johnson | May 14, 1929 |
| 3,065,722 | Green | Nov. 27, 1962 |
| 3,084,654 | Rosenberg | Apr. 9, 1963 |

FOREIGN PATENTS

| | | |
|---|---|---|
| 897,816 | Germany | Nov. 23, 1953 |